(12) United States Patent
Yamada

(10) Patent No.: US 8,385,077 B2
(45) Date of Patent: Feb. 26, 2013

(54) ELECTRONIC DEVICE

(75) Inventor: Satoru Yamada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 321 days.

(21) Appl. No.: 12/900,390

(22) Filed: Oct. 7, 2010

(65) Prior Publication Data

US 2011/0085309 A1 Apr. 14, 2011

(30) Foreign Application Priority Data

Oct. 9, 2009 (JP) ................... 2009-235429

(51) Int. Cl.
*H05K 1/14* (2006.01)
*H05K 7/16* (2006.01)
*H05K 5/00* (2006.01)
*H05K 7/14* (2006.01)

(52) U.S. Cl. ........ 361/741; 361/727; 361/752; 361/755; 361/756; 361/802

(58) Field of Classification Search ............. 361/679.01, 361/679.33, 727, 730, 741, 752, 755, 756, 361/796, 801, 802
See application file for complete search history.

(56) References Cited

U.S. PATENT DOCUMENTS

| 5,030,108 | A | * | 7/1991 | Babow et al. | .................. 439/64 |
| 5,086,372 | A | * | 2/1992 | Bennett et al. | ................ 361/802 |
| 5,660,553 | A | * | 8/1997 | Larabell | ........................ 439/160 |
| 2005/0174743 | A1 | * | 8/2005 | Downing et al. | ............. 361/725 |

FOREIGN PATENT DOCUMENTS

| JP | 9-171874 | 6/1997 |
| JP | 2008-47019 | 2/2008 |

* cited by examiner

*Primary Examiner* — Timothy Thompson
*Assistant Examiner* — Sherman Ng
(74) *Attorney, Agent, or Firm* — Fujitsu Patent Center

(57) ABSTRACT

An electronic device includes a housing having an accommodation space, a first support body being slidably insertable into the accommodation space in parallel with a predetermined plane, a second support body coupled with the first support body rotatably around a rotation axis parallel to a front side of the housing and being rotatable between a reference attitude disposed in the same plane with respect to the first support body and an inclined attitude disposed at a given angle with respect to the first support body, and a drive mechanism for changing the attitude of the second support body.

18 Claims, 17 Drawing Sheets

ELECTRONIC DEVICE

CROSS-REFERENCE TO RELATED APPLICATIONS

This application is based upon and claims the benefit of priority of the prior Japanese Patent Application No. 2009-235429, filed on Oct. 9, 2009, the entire contents of which are incorporated herein by reference.

FIELD

The embodiments discussed herein are related to a technology for an electronic device.

BACKGROUND

Conventionally, for example, a storage blade is mounted in a rack of a server computer apparatus. A plurality of hard disk drives (HDDs) are inserted into a housing of the storage blade from front side of the housing in parallel. A front end of the HDD is received by an assisted panel that extends upward in parallel with the front side of the housing. For example, two control units that control the HDDs are inserted into the housing in parallel with the HDDs. Each of the control units includes a printed circuit board on which a connector is mounted at a front end of the printed circuit board. When the control unit is inserted into the housing from the front end of the control unit, the connector of the printed circuit board is received by a back panel that extends upward in parallel with the back side of the housing. An interconnecting board connects the back panel to the assisted panel. As a result, the HDDs are controlled by an electronic circuit component which is mounted on the printed circuit board.

Japanese Laid-open Patent Publication No. 9-171874 and No. 2008-47019 are examples in conventional technique.

The storage blade is connected to the large back panel arranged in the rack of the server computer apparatus. A connector which is mounted on the back panel in the housing of the storage blade is used to connect the storage blade to the large back panel. The connector is received by the large back panel. With the arrangement of the connector, a predetermined depth of the housing is secured. That is, the depth of the housing is determined according to the depth of the rack of the server computer apparatus. On the other hand, the depth of the HDD from the front side of the housing is smaller than the depth of the housing. As a result, a dead space is formed between the back side of the assisted panel and the back panel.

SUMMARY

According to an aspect of the invention, an electronic device includes a housing having an accommodation space, a first support body being slidably insertable into the accommodation space in parallel with a predetermined plane, a second support body coupled with the first support body rotatably around a rotation axis parallel to a front side of the housing and being rotatable between a reference attitude disposed in the same plane with respect to the first support body and an inclined attitude disposed at a given angle with respect to the first support body, and a drive mechanism for changing the attitude of the second support body from the reference attitude to the inclined attitude in the accommodation space, upon the first support body being inserted into the accommodation space.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT

Hereafter, an electronic device according to an embodiment is described in detail with reference to the accompanying drawings.

Figure 1:
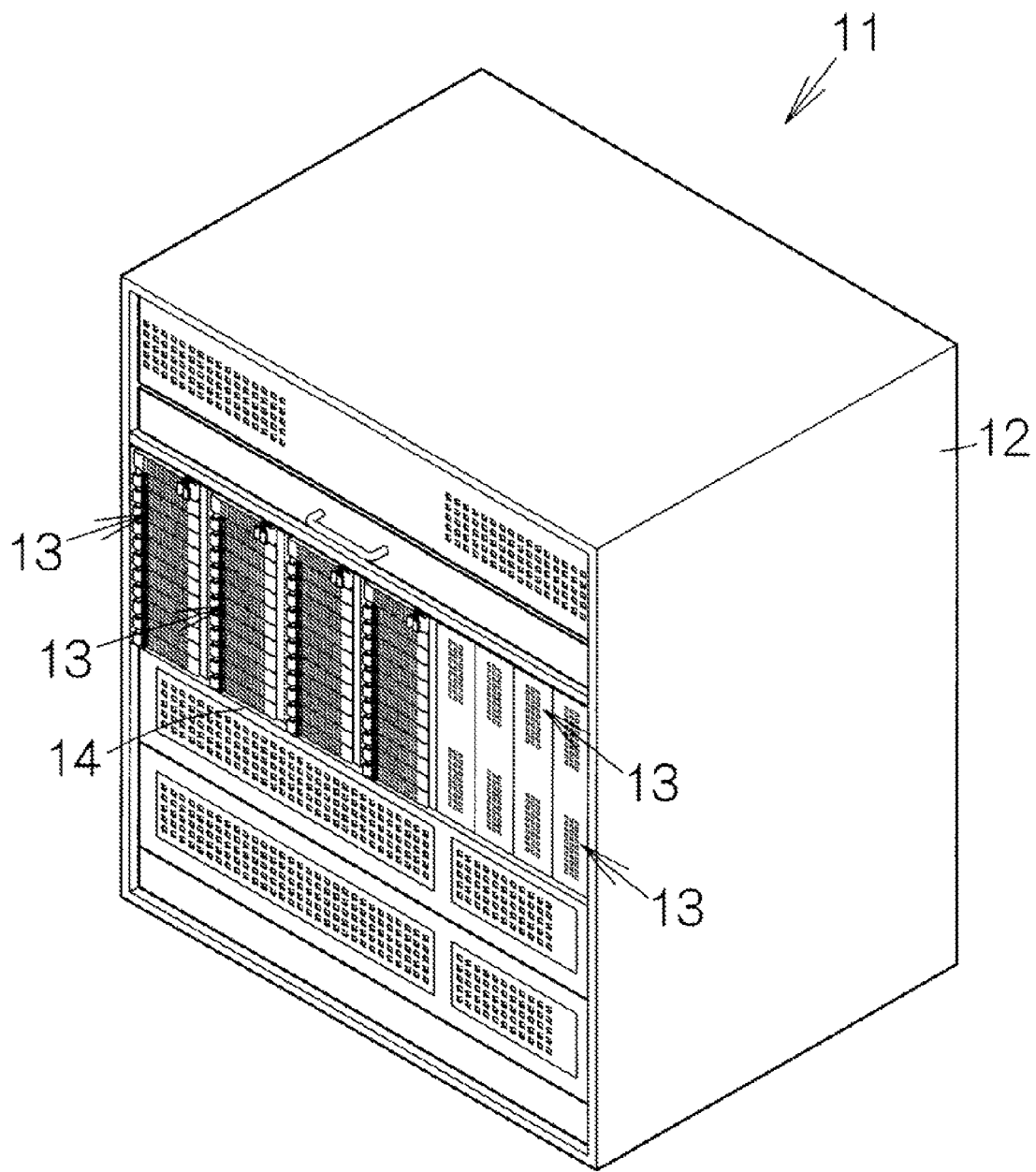
FIG. 1 schematically illustrates a perspective view of a server computer apparatus.

FIG. 1 schematically illustrates a perspective view of a server computer apparatus 11 as an example of one embodiment of an apparatus mounting a plurality of electronic devices. The server computer apparatus 11 includes a rack 12 that is disposed on the floor face that extends along a horizontal plane. The rack 12 mounts a plurality of the electronic device 13. The electronic device 13, for example, is formed in a vertically-elongated box shape in a direction perpendicular to the horizontal plane. The electronic device 13, for example, is a server blade or a storage blade. The various data are transmitted and received between the server blades or between the server blade and the storage blade. The storage blade operates on the basis of the instruction of the server blade. This server computer apparatus 11 is connected to, for example, the RAID (Redundant Arrays Inexpensive Disks).

Figure 2:
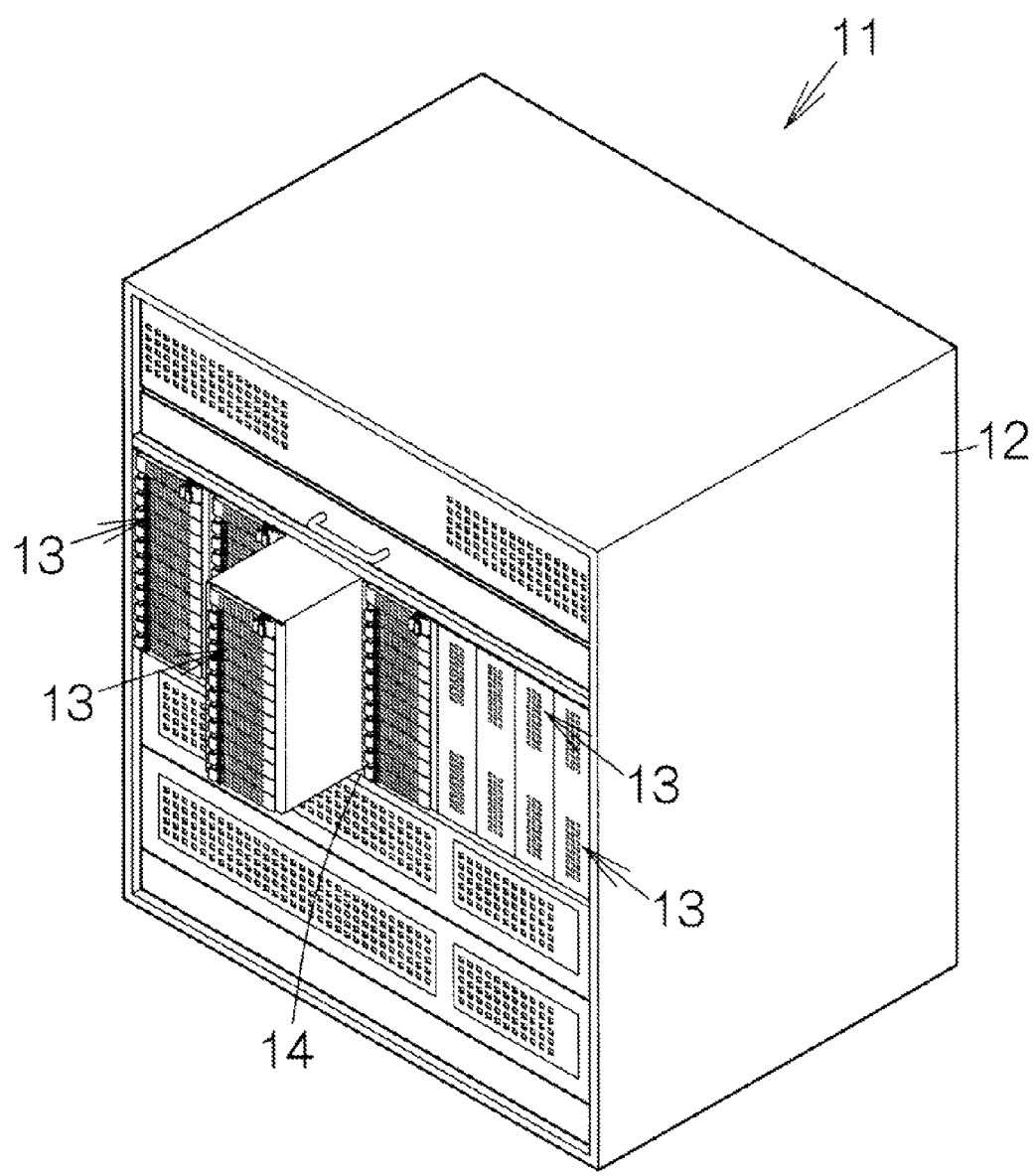
FIG. 2 schematically illustrates a perspective view of an electronic device that is removed forward from a rack of the server computer apparatus.

FIG. 2 schematically illustrates a perspective view of an electronic device 13 that is removed forward from a rack 12 of the server computer apparatus 11. Refer also to FIG. 2. A storage rack 14 that accommodates the electronic device 13 is disposed in the rack 12. The storage rack 14 extends along the horizontal plane. For example, a guide member (not illustrated) that extends in front-back direction of the rack 12 is fixed on the storage rack 14. The electronic device 13 is slidably inserted into or removed from the rack 12 along the horizontal plane from the front side of the rack 12 that extends in a vertical direction according to the operation of the guide member. A main back panel described later is disposed at the back side of the rack 12 that extends in a vertical direction. The main back panel is disposed in the rack 12. The main back panel keeps in a vertical attitude that extends in a vertical direction in parallel with the front side of the rack 12. When the electronic device 13 is inserted into the storage rack 14, the connector of the back side of the electronic device 13 is connected to the connector of the main back panel.

Figure 3:
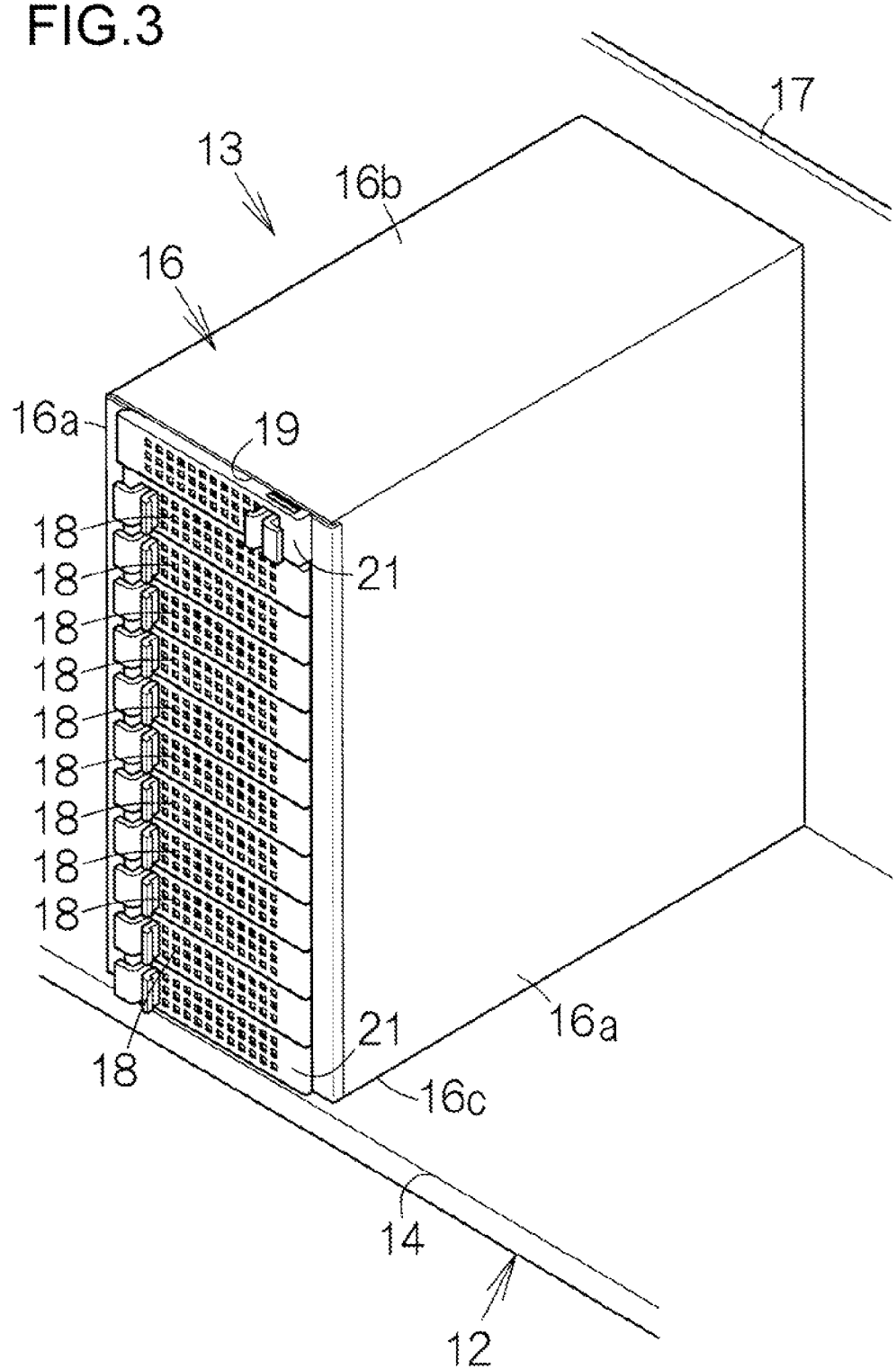
FIG. 3 schematically illustrates a perspective view of a structure of the electronic device according to an embodiment.

FIG. 3 schematically illustrates a perspective view of a structure of the electronic device 13. As illustrated in FIG. 3, the storage blade, that is, the electronic device 13 includes a housing 16 that is formed in a box shape. A back side of the housing 16 is received by a main back panel 17 that is disposed in the rack 12. A plurality of storage device units 18 are accommodated in the accommodating space of the housing 16. Each of the storage device units 18 keeps a horizontal attitude that extends along a horizontal plane. The storage device units 18 in the horizontal attitude are arranged in a vertical direction. The each storage device unit 18 is slidably inserted into or removed from the accommodating space along the horizontal plane through an insertion port 19 that is formed in the front side of the housing 16. The storage device unit 18 is guided by, for example, guide rails (not illustrated) that are secured on the inner surface of side walls 16a of the housing 16. The side walls 16a extend in parallel with each other.

In the accommodating space of the housing 16, a respective control board unit 21 is accommodated on the uppermost storage device unit 18 and under the lowermost storage device unit 18. One of the control board units 21 controls a plurality of the HDDs 22. The redundancy is secured by the two control board units 21. The control board unit 21 that arranged on the uppermost storage device unit 18 is disposed along a top plate 16b of the housing 16. The control board unit 21 that arranged under the lowermost storage device unit 18 is disposed along a bottom plate 16c of the housing 16. The top plate 16b and the bottom plate 16c extend in parallel with each other. The control board unit 21 keeps a horizontal attitude that extends along in the horizontal plane. The control board unit 21 is slidably inserted into or removed from the accommodating space through the insertion port 19 that is formed in the front side of the housing 16 along the horizontal plane.

Figure 4:
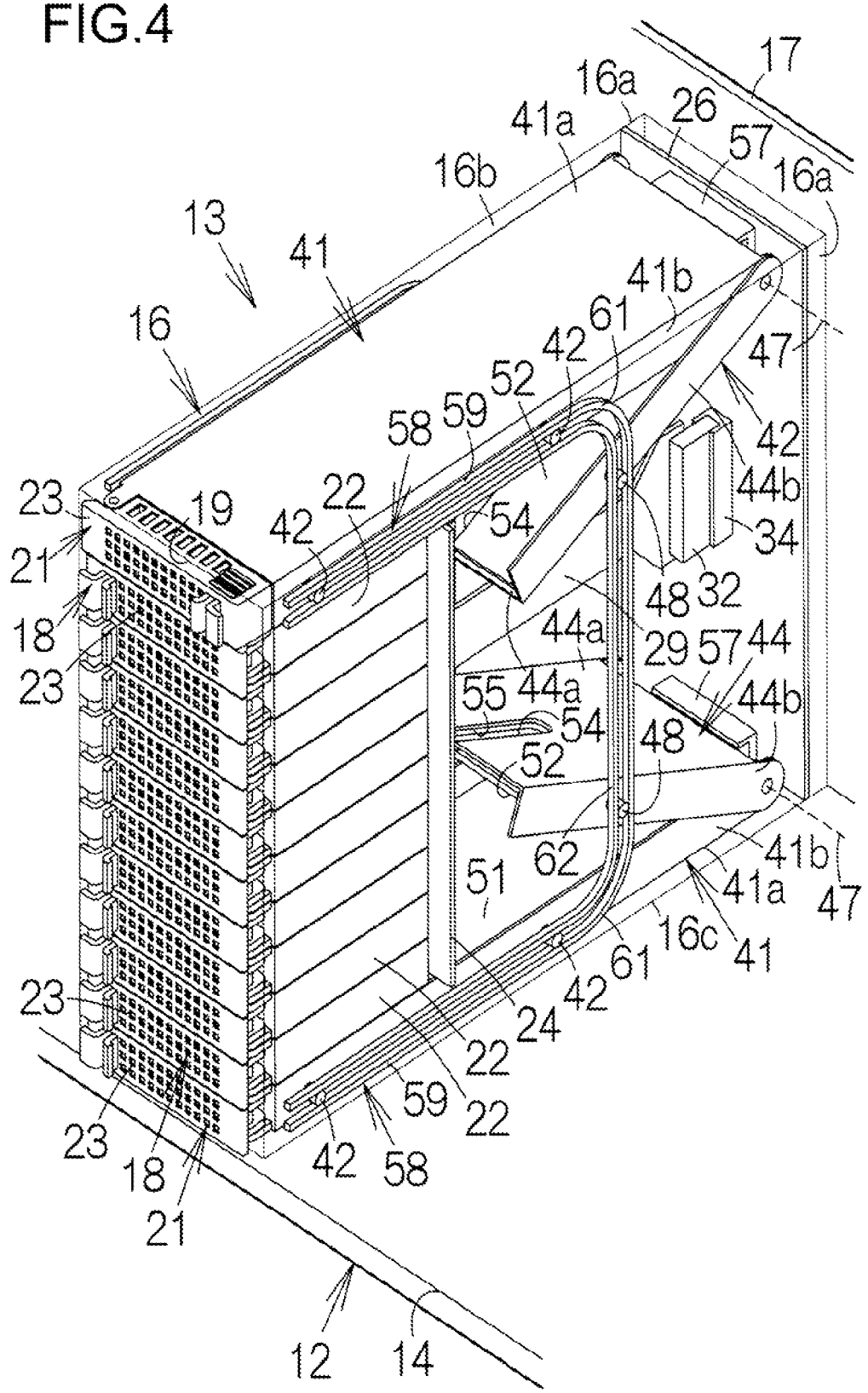
FIG. 4 schematically illustrates a transparent perspective view of a structure of the electronic device according to an embodiment.
Figure 5:
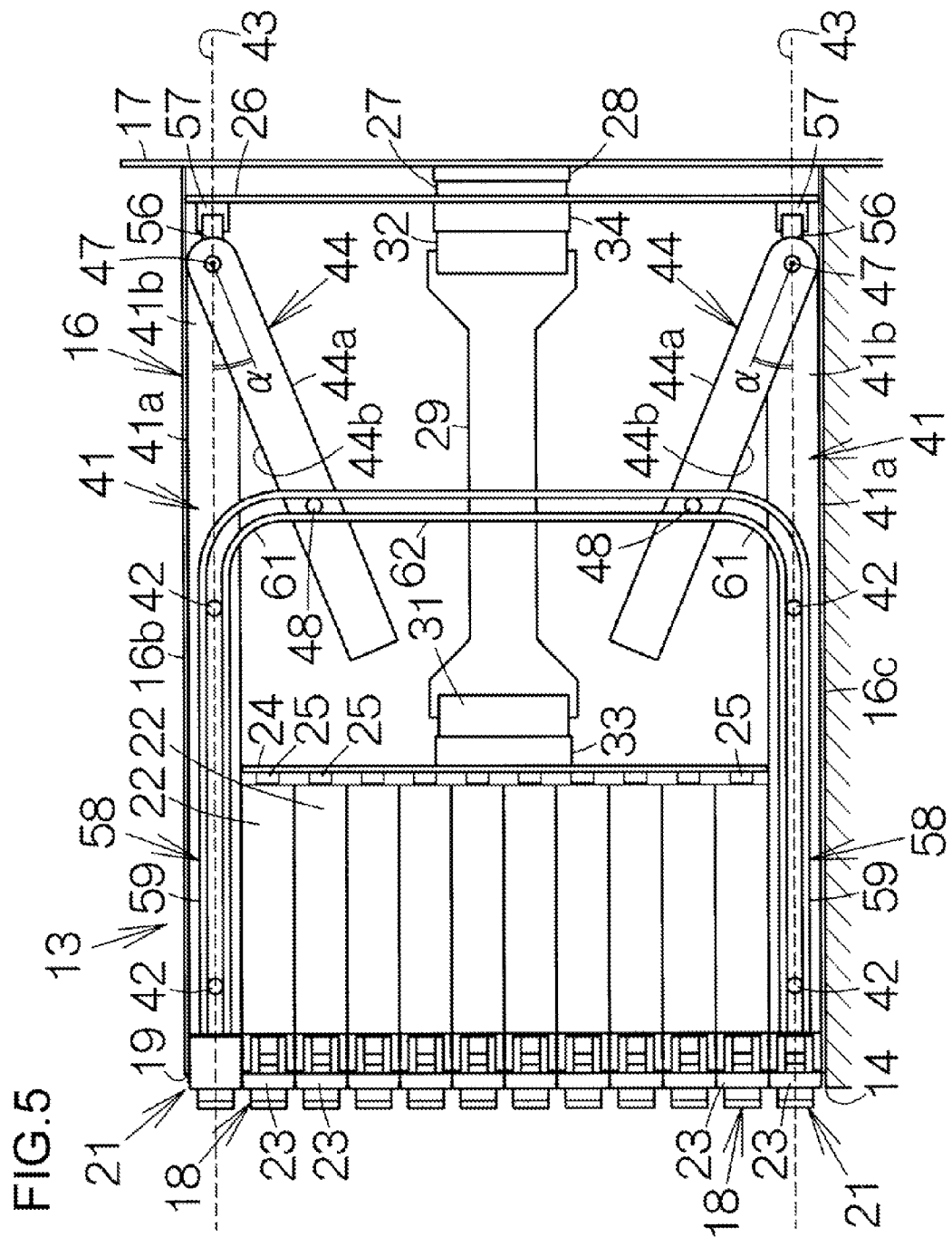
FIG. 5 schematically illustrates a transparent side view of a structure of the electronic device according to an embodiment.

FIG. 4 schematically illustrates a transparent perspective view of a structure of the electronic device 13. As illustrated in FIG. 4, the storage device unit 18 includes a hard disk drive (HDD) 22 as an example of a storage device. A rotation shaft of a magnetic disk as an example of a storage medium in the HDD 22 is provided in vertical direction perpendicular to the horizontal plane. The storage device unit 18 includes an ejector unit 23 that is disposed on the rear end of the HDD 22. The ejector unit 23, for example, is disposed in the insertion port 19. The front end of the HDD 22 is received by an assisted panel such as a front panel 24. The front panel 24 keeps a vertical attitude that extends in a vertical direction parallel to the front side of the housing 16. For example, the front panel 24 is fixed to the side walls (16a, 16a). For example, the front panel 24 is made of a plastic board. FIG. 5 schematically illustrates a transparent side view of a structure of the electronic device 13. Refer also to FIG. 5. A connector (not illustrated) provided on the front end of the HDD 22 is connected to a connector that is provided on the front surface of the front panel 24. Thus the HDD 22 is connected to the front panel 24.

A back panel 26 that extends in parallel with the front panel 24 is disposed in the back of the housing 16. For example, the back panel 26 is made of a plastic board. A predetermined accommodating space is provided between the back panel 26 and the front panel 24. A rear connector 27 is mounted on the back side of the back panel 26. The rear connector 27 is connected to a connector 28 that is mounted on the main back panel 17 of the server computer apparatus 11. An interconnecting board 29 is disposed in the accommodating space between the back panel 26 and the front panel 24. For example, the interconnecting board 29 is a flexible printed circuit board. The interconnecting board 29 extends in parallel with the side wall 16a. The interconnecting board 29 is provided so that the distance between the top plate 16b and the interconnecting board 29 is equal to the distance between the bottom plate 16c and the interconnecting board 29. The side walls (16a, 16a) are located at the same distance from the interconnecting board 29.

FIG. 5 schematically illustrates a transparent side view of a structure of the electronic device 13. As illustrated in FIG. 5, a connector 31 and a connector 32 are mounted on a rear end and a front end of the interconnecting board 29, respectively. The connector 31 is connected to a connector 33 that is mounted on the back side of the front panel 24. The connector 32 is connected to a connector 34 that is mounted on the front side of the back panel 26. Thus the front panel 24 and the back panel 26 are connected through the interconnecting board 29. The HDD 22 is connected to the back panel 26 and the main back panel 17. As a result, for example, when the server blade issues a read instruction or a write instruction to the electronic device 13 through the main back panel 17, the read instruction or the write instruction is given to the each HDD 22 trough the back panel 26, the interconnecting board 29 and the front panel 24.

The control board units 21 are formed into the same shape. In this embodiment, one of the control board units 21 is disposed to be upside down relative to the other control board unit 21. As a result, the control board units 21 are disposed in symmetry with respect to a centerline extending in front-back direction of the housing 16 on a virtual plane that is located at the same distance from the top plate 16b and the bottom plate 16c and extends in parallel with the horizontal plane. The centerline is located at the same distance from the side walls (16a, 16a). Therefore when the upper control board unit 21 is changed for the lower control board unit 21, the each control board unit 21 may be similarly accommodated in the housing 16. And the one of the control board units 21 operates similarly to the other control board unit 21.

The each control board unit 21 includes a first support body 41 that extends from the front side to the back side of the housing 16. The first support body 41 is disposed on the top plate 16b or the bottom plate 16c. The first support body 41 includes a bottom plate 41a that extends along the horizontal plane and a pair of side plates 41b that upstand from the side ends of the bottom plate 41a, which are located between the front end and the rear end of the bottom plate 41a. The bottom plate 41a and the side plates 41b are made of a metal plate such as a sheet metal. The ejector unit 23 is fixed on the rear end of the first support body 41. For example, the side plate 41b includes a pair of guide components such as a pair of guide pins 42 that project from the outer surface of the side plate 41b. For example, the guide pin 42 is formed into a circular cylindrical shape. As illustrated in FIG. 5, the central axis of the guide pin 42 is located in a virtual plane 43 parallel to the horizontal plane. Therefore the bottom plate 41a is located in parallel with the virtual plane 43.

Figure 6:
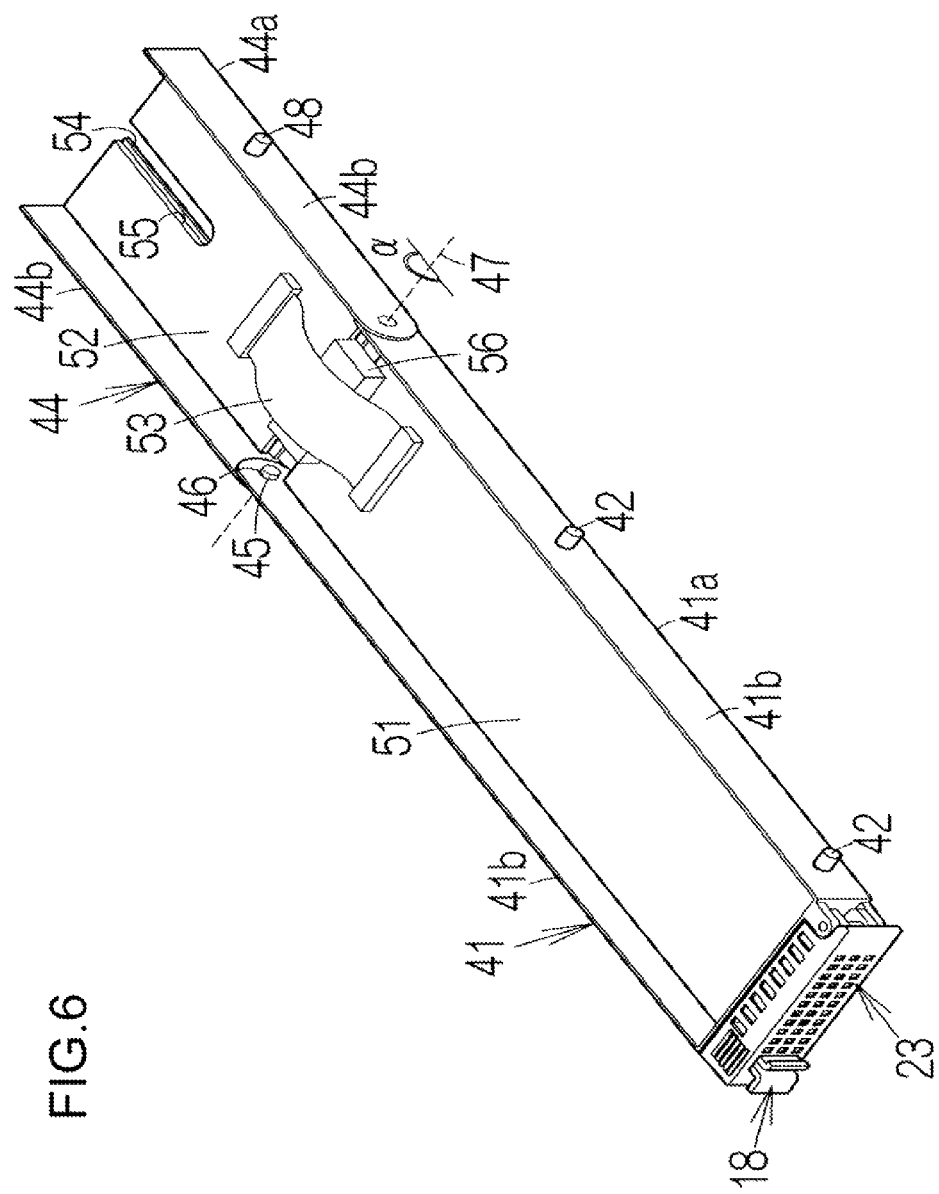
FIG. 6 schematically illustrates a perspective view of a structure of a control board unit.

FIG. 6 schematically illustrates a perspective view of a structure of the control board unit 21. The each control board unit 21 includes a second support body 44. The rear end of the second support body 44 is coupled with the front end of the first support body 41. The second support body 44 includes a bottom plate 44a and a pair of side plates 44b as well as the first support body 41. The side plates 44b upstand from the side ends of the bottom plate 44a that are located between the front end and the rear end of the bottom plate 44a. The bottom plate 44a and the side plates 44b are made of a metal plate such as a sheet metal. For coupling with the first support body 41, the second support body 44 includes support shafts 45 that projects from the inner surface of the side plates 44b. FIG. 6 schematically illustrates a perspective view of a structure of the control board unit. Refer also to FIG. 6. The support shafts 45 are inserted through holes 46 that are formed on the side plates 41b. The central axis of the support shaft 45 is coincident with the central axis of rotation axis 47. The rotation axis 47 is located in parallel with the insertion port 19 on the virtual plane 43. The rotation axis 47 is perpendicular to the side wall 16a. Thus the second support body 44 is rotatably coupled with the first support body 41 about the rotation axis 47. Therefore the central axis of the guide pin 42 is located in parallel with the rotation axis 47.

The second support body 44 intersects with the first support body 41, for instance, at an intersection angle alpha that is greater than 0 degrees and smaller than or equal to 180 degrees about the rotation axis 47. For instance, the intersection angle alpha is specified between a plane including the surface of bottom plate 41a and a plane including the surface of bottom plate 44a. When the intersection angle alpha is set to 180 degrees, the first support body 41 is disposed coplanar with the second support body 44 as illustrated in FIG. 6. Thus, the first support body 41 and the second support body 44 keep a horizontal attitude, that is, a reference attitude. When the intersection angle alpha is set smaller than 180 degrees, the first support body 41 and the second support body 44 keeps an inclined attitude. As illustrated in FIGS. 4 and 5, when the control board unit 21 is disposed in the accommodated position in the accommodation space of the housing 16, the second support body 44 keeps the inclined attitude that intersects, for instance, with the first support body 41 at the intersection angle alpha of 30 degrees.

The width of bottom plate 41a of the first support body 41 that is located in a parallel with the rotation axis 47 is set equally to the width of bottom plate 44a of the second support body 44 that is similarly located in a parallel with the rotation axis 47. The height of the side plate 41b measured from the bottom plate 41a agrees with the height of the side plate 44b measured from the bottom plate 44a. The distance between the front end and the rear end of the bottom plate 41a is set larger than the distance between the front end and the rear end of the bottom plate 44a. For instance, the distance of bottom plate 41a is set to the distance of more than twice the distance of the bottom plate 44a. A guide pin 48 that projects from the outer surface of the side plate 44b of the second support body 44 is formed. For instance, the guide pin 48 is formed into a circular cylindrical shape. The guide pin 48 has a central axis parallel to the central axis of the guide pin 42. The guide pin 48 is set to the same size as the guide pin 42. The central axis of the guide pin 48 is located in parallel with the rotation axis 47 as well as the guide pin 42.

A first printed circuit board 51 is supported on the bottom plate 41a of the first support body 41 as illustrated in FIG. 4 and FIG. 6. The first printed circuit board 51 is fixed to the bottom plate 41a. Similarly, a second printed circuit board 52 is supported on the bottom plate 44a of the second support body 44. The second printed circuit board 52 is fixed to the bottom plate 44a. For instance, electronic circuit elements (not illustrated) such as a RAID controller or CPU (central processing unit) are mounted on the surface of the first printed circuit board 51 and on the surface of the second printed circuit board 52. The electronic circuit element issues a read instruction or a write instruction to each of the HDDs 22. The first printed circuit board 51 and the second printed circuit board 52 are interconnected, for instance, by a flexible printed circuit board 53.

The second support body 44 has a slit 54 that is cut at a portion extending from a front end toward a rear end of the bottom plate 44a. For instance, the slit 54 is set to an equal distance from the side plates (44b, 44b). The second printed circuit board 52 that is mounted on the bottom plate 44a has the slit 55 that has the same outline as the slit 54. On the other hand, the connector 56 is mounted on the front side of the first printed circuit board 51. The connector 56 is provided outside the rotational orbit of the rear end of the bottom plate 44a of the second support body 44 about the rotation axis 47. As a result, the connector 56 does not interfere with a relative rotation of the second support body 44 relative to the first support body 41. The connector 56 is connected with the connector 57 that is mounted on the front side of the back panel 26. Thus, the first printed circuit board 51 of the control board unit 21 and the second printed circuit board 52 of the control board unit 21 are coupled with the HDD 22 through the back panel 26.

The guide pins 42 of the first support body 41 and the guide pin 48 of the second support body 44 are arranged in a pair of guide rails 58 that are fixed to the inner surface of each side wall 16a. The guide rails 58 include a pair of first guide rails 59 which linearly extend in parallel with the virtual plane 43 from rear ends of the first guide rails 59 located at the insertion port 19 toward the back side of the housing 16. The front ends of the first guide rails 59 are arranged nearer the insertion port 19 than the front end of the first support body 41. In addition, the front ends of the first guide rails 59 are arranged between the front panel 24 and the back panel 26. When the control board units 21 are disposed in the accommodated position, the guide pins 42 are arranged in the first guide rails 59. The guide pins 42 on the side plate 41b of the first support body 41 are away from each other at a prescribed interval.

The guide rails 58 include a pair of second guide rails 61. The first ends of the second guide rails 61 are coupled with the front ends of the first guide rails 59. The second ends of the second guide rails 61 extend away from the virtual plane 43 toward the back side of the housing 16 from insertion port 19.

Here, the second guide rails 61 are arranged along circular arc about central axis perpendicular to the side wall 16a. The central axis is located in parallel with the rotation axis 47. Here, the central angle of the circular arc is set to 90 degrees.

The distance from the insertion port 19 to the first end of one of the second guide rails 61 is set to be equal to the distance from the insertion port 19 to the first end of the other second guide rail 61. The size of one of the second guide rails 61 is set to be equal to the size of the other second guide rail 61. As a result, the distance from the insertion port 19 to the second end of one of the second guide rails 61 is set to be equal to the distance from the insertion port 19 to the second end of the other second guide rail 61.

The guide rails 58 include a pair of third guide rails 62. First ends of the third guide rails 62 are coupled with the second ends of the second guide rails 61 located at upper side of the housing 16 and second ends of the third guide rails 62 are coupled with the second ends of the second guide rails 61 located at lower side of the housing 16. That is, the third guide rails 62 couple the upper second guide rails 61 with the lower second guide rails 61 each other. The third guide rails 62 extend in a vertical direction perpendicular to the virtual plane 43. When the control board unit 21 is disposed in the accommodated space, the guide pin 48 is arranged in the third guide rails 62. The guide rails 58 are formed from round bars or from square bars that are made of metal or the resin. The guide pins 42, 48 and the guide rails 58 are corresponding to a drive mechanism in the claims.

Figure 7:
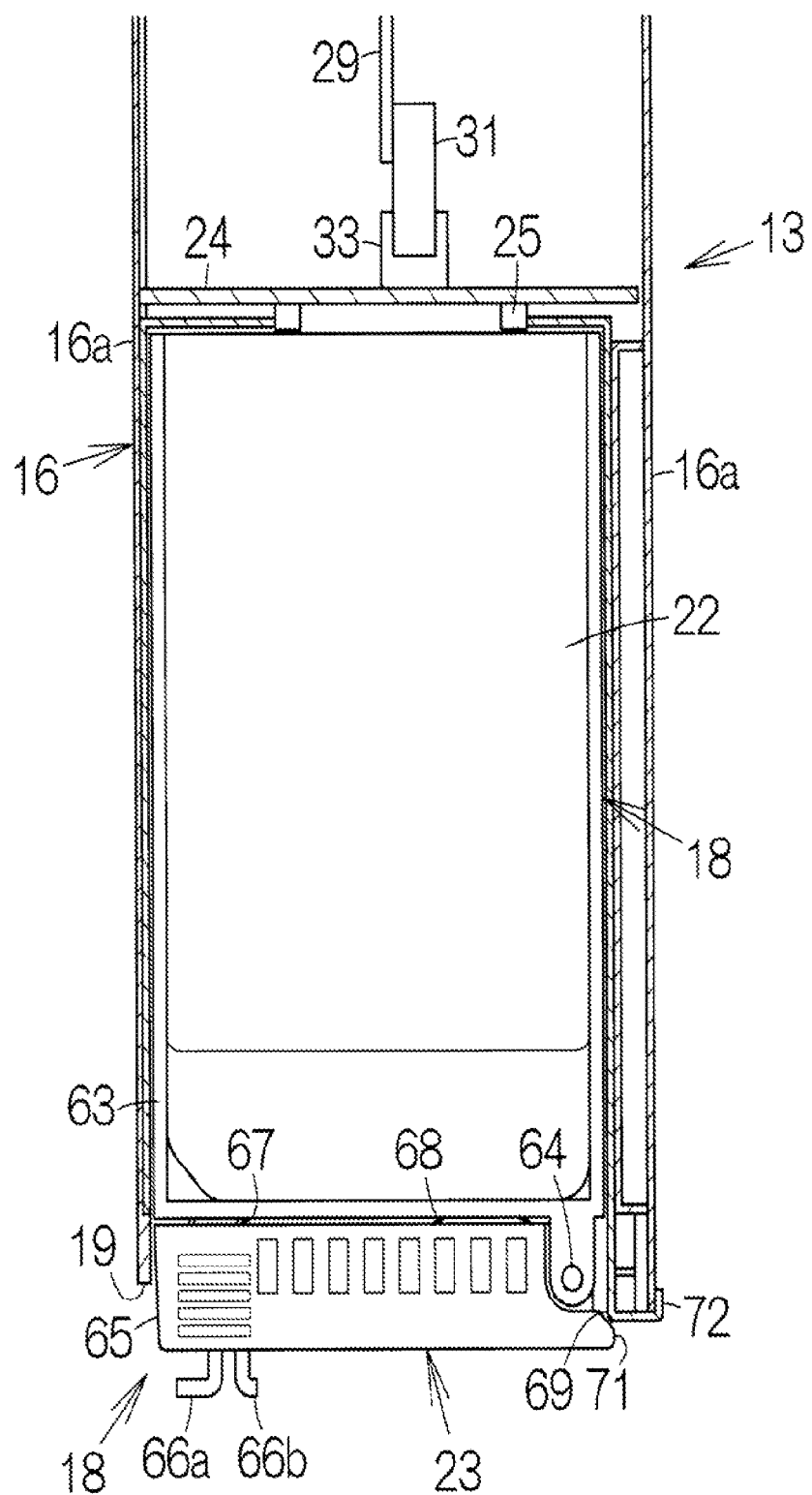
FIG. 7 illustrates a first partially enlarged sectional view of the electronic device that schematically illustrates a structure of a storage device unit.

FIG. 7 illustrates a first partially enlarged sectional view of the electronic device 13 that schematically illustrates a structure of a storage device unit 18. As illustrated in FIG. 7, the ejector unit 23 includes a case 63 that encloses the back side and the both sides of the HDD 22. The case 63 is opened in front of the HDD 22. The handle part 65 is coupled with the case 63, which is arranged along the back side of the HDD 22, so that the handle part 65 is rotatably about a rotation shaft 64 perpendicular to the virtual plane 43. The handle part 65 extends along the front side of the case 63. The rotation shaft 64 is arranged, for instance, next to the side of the case 63. When the handle part 65 is arranged at the coupled position that keeps coupling between the case 63 and the handle part 65, the handle part 65 extends along the front side of the case 63. A pair of knobs 66a and 66b that are separated each other at a prescribed reference interval on the handle part 65 are mounted. The knobs 66a and 66b project forward from the front side of the handle part 65. The knobs 66a and 66b move toward and away from each other in parallel with the front side of the handle part 65 that are located in parallel with the horizontal plane.

Figure 8:
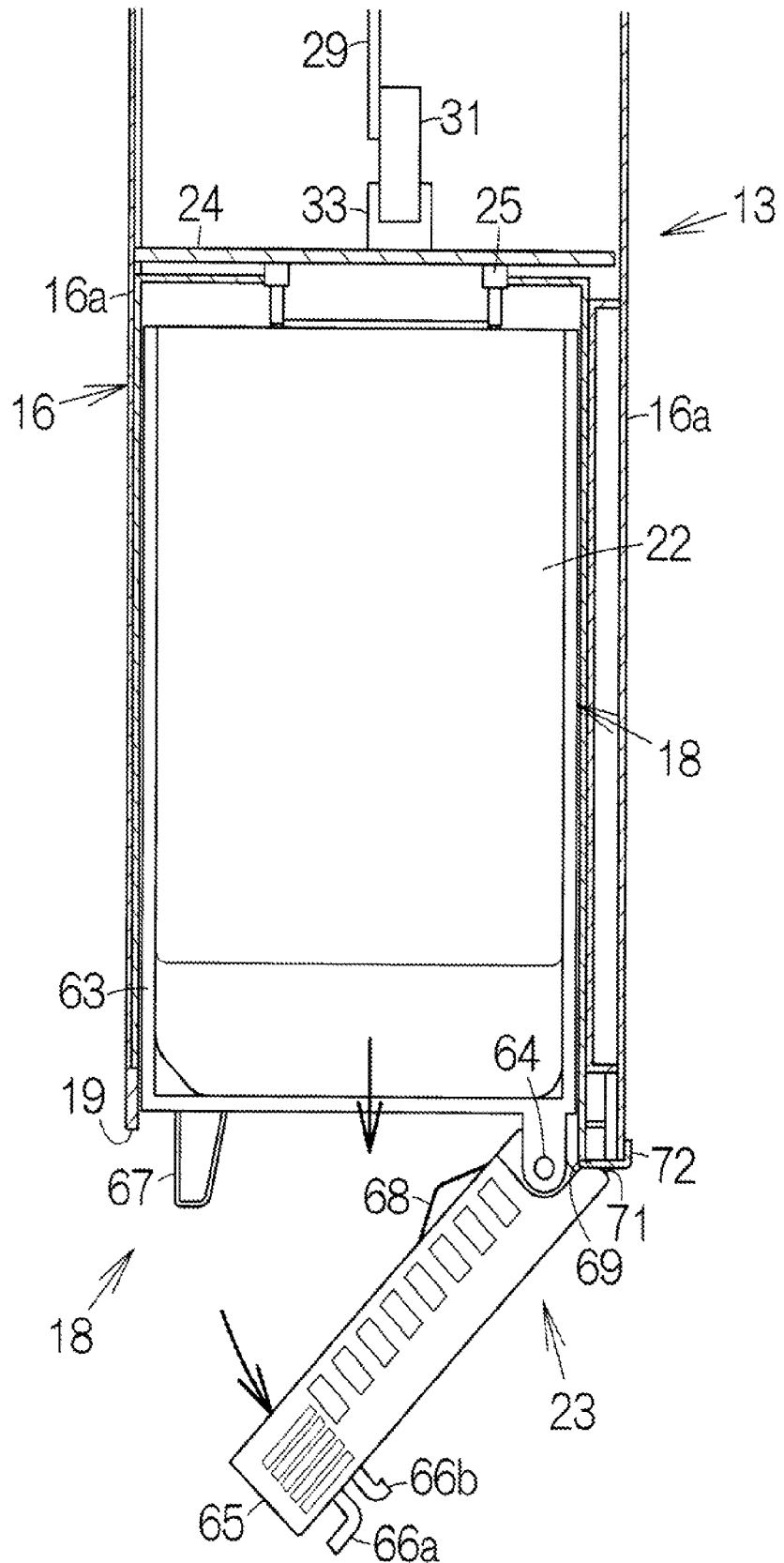
FIG. 8 illustrates a second partially enlarged sectional view of the electronic device that schematically illustrates a structure of the storage device unit.

FIG. 8 illustrates a second partially enlarged sectional view of the electronic device 13 that schematically illustrates a structure of a storage device unit 18. FIG. 8 is also referred, and the knobs 66a and 66b engage with a projecting member 67 that projects forward from the front end of the case 63 at the coupled position. The rotation of the handle part 65 is restricted. When the knobs 66a and 66b move toward one another from the position separated by prescribed reference interval, the engagement between the knobs 66a, 66b and the projecting member 67 is released. The rotation of handle part 65 is allowed. The handle part 65 is arranged at the released position. The elastic member such as a plate spring 68 is fixed to the back side of the handle part 65. The plate spring 68 projects from the back side of the handle part 65 on the basis of the bend of the plate spring 68. The plate spring 68 is pressed on the front side of the case 63 at the coupled position. The plate spring 68 is charged with elastic energy. When the engagement between the knobs 66a, 66b and the projecting member 67 is released, a drive force is given to the handle part 65 about the rotation shaft 64 on the basis of the elastic energy of the plate spring 68.

Figure 9:
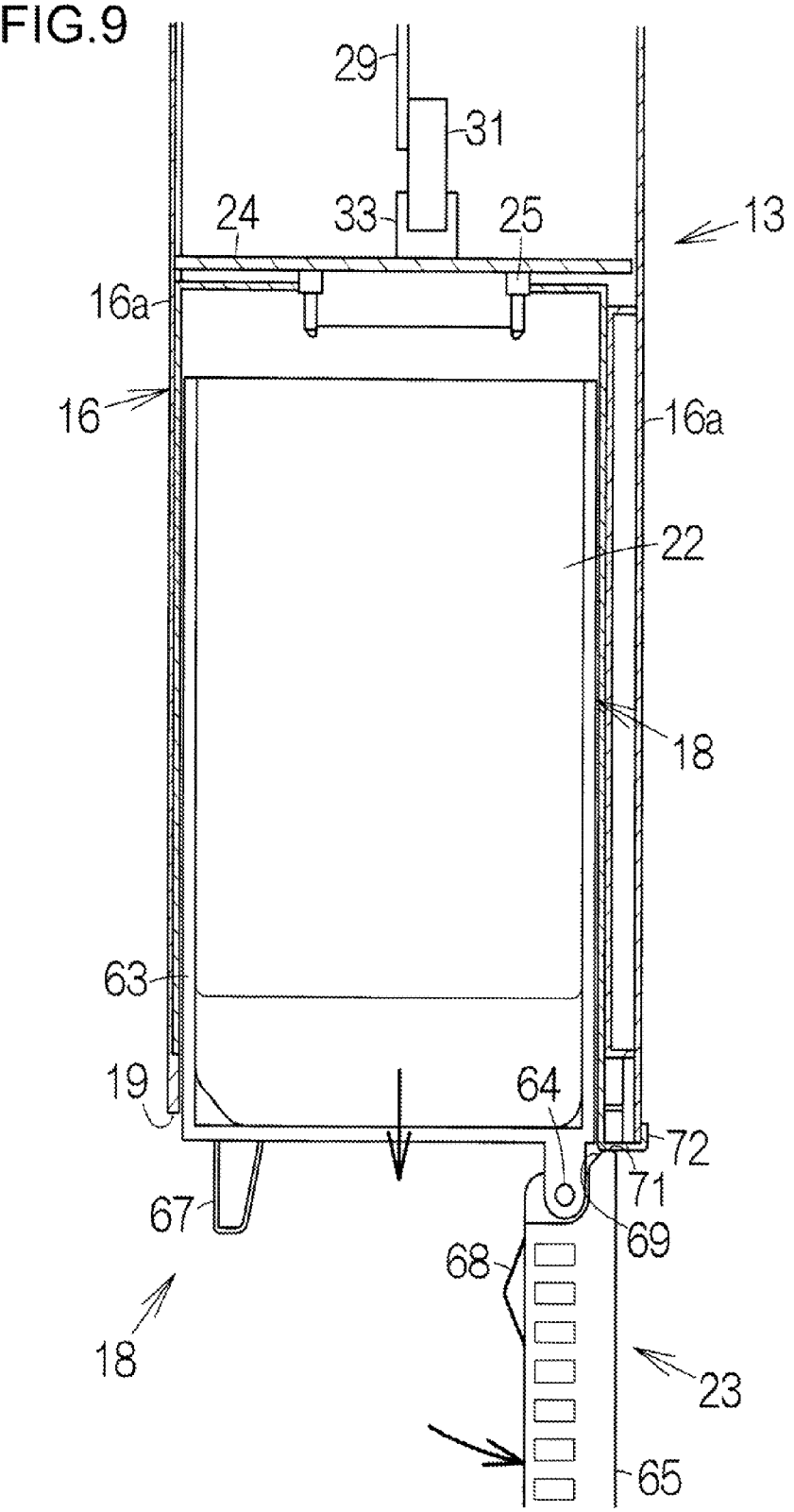
FIG. 9 illustrates a third partially enlarged sectional view of the electronic device that schematically illustrates a structure of the storage device unit.

The handle part 65 has a first side face 69 and a second side face 71 that are located on a plane parallel to the rotation shaft 64. The first side face 69 and the second side face 71 intersect at a prescribed angle. On the other hand, the housing 16 includes a square pillar 72 that extends upward from the horizontal plane. As illustrated in FIG. 8, when the handle part 65 rotates about the rotation shaft 64, the first side face 69 is pressed against the corner of the square pillar 72. As a result, the drive force is given to the storage device unit 18 in forward direction from the insertion port 19 along a horizontal plane according to the rotation of the handle part 65. The storage device unit 18 is slightly moved forward from the insertion port 19. FIG. 9 illustrates a third partially enlarged sectional view of the electronic device 13 that schematically illustrates a structure of the storage device unit 18. As illustrated in FIG. 9, when the handle part 65 further rotates about the rotation shaft 64, the second side face 71 is pressed against the front side of the square pillar 72. Thus, the connection between the connector of the HDD 22 and the connector 25 is released. Subsequently, for instance, a manager may extract the storage device unit 18 in forward direction with gripping the handle part 65.

On the other hand, when the storage device unit 18 is mounted, the front end of the storage device unit 18 is inserted from the insertion port 19. At this time, the handle part 65 is arranged at the released position. The manager inserts the storage device unit 18 with gripping the handle part 65. The handle part 65 rotates from the released position toward the coupled position when a large part of the HDD 22 is inserted in the housing 16. As a result, the connector of HDD 22 is concurrently connected to the connector 25 of the front panel 24 when the knobs 66a and 66b engage with the projecting member 67. Thus, the storage device unit 18 is accommodated in the accommodation space of the housing 16. With regard to the ejector unit 23 of the control board unit 21, the case 63 may be integrated at the rear end of the first support body 41.

Figure 10:
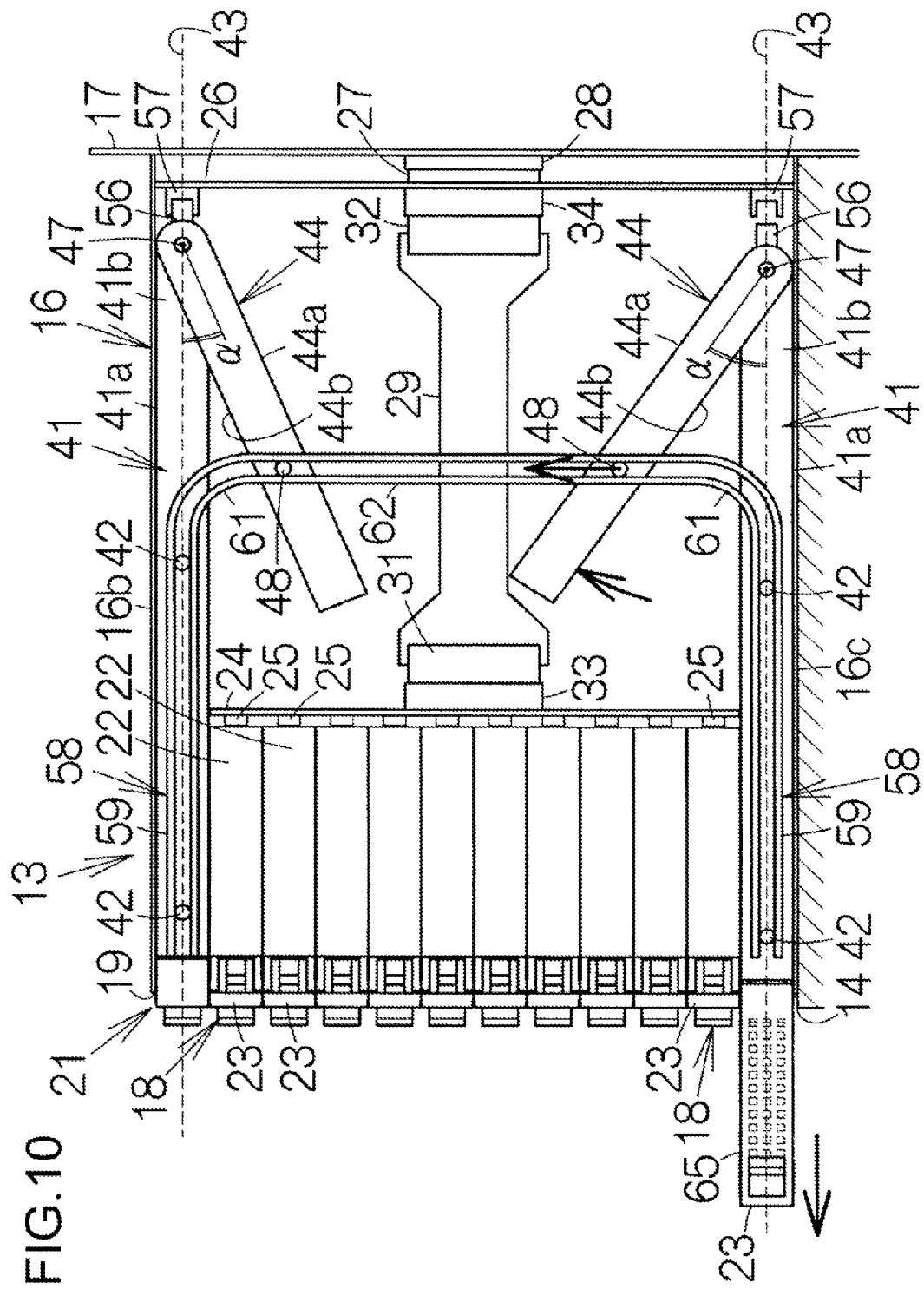
FIG. 10 schematically illustrates a first transparent side view of lower the control board unit that is removed from a housing of the electronic device.

And now, assume that the lower control board unit 21 is removed from the electronic device 13. When the first side face 69 of the handle part 65 of the ejector unit 23 is pressed against the corner of the square pillar 72, the lower control board unit 21 is slightly removed forward. FIG. 10 schematically illustrates a first transparent side view of the lower control board unit 21 that is removed from the housing 16 of the electronic device 13. As a result, as illustrated in FIG. 10, the connection between the connector 56 of the lower control board unit 21 and the connector 57 of the back panel 26 is released. At this time, the guide pin 42 is guided to the first guide rails 59. The first support body 41 moves slidably along the virtual plane 43. The rotation axis 47 moves toward the insertion port 19 on the virtual plane 43. The guide pin 48 of the second support body 44 moves upward along the third guide rails 62 according to the movement of the rotation axis 47. The second support body 44 rotates about the rotation axis 47 while the guide pin 48 moves upward. The intersection angle alpha is increasing.

Figure 11:
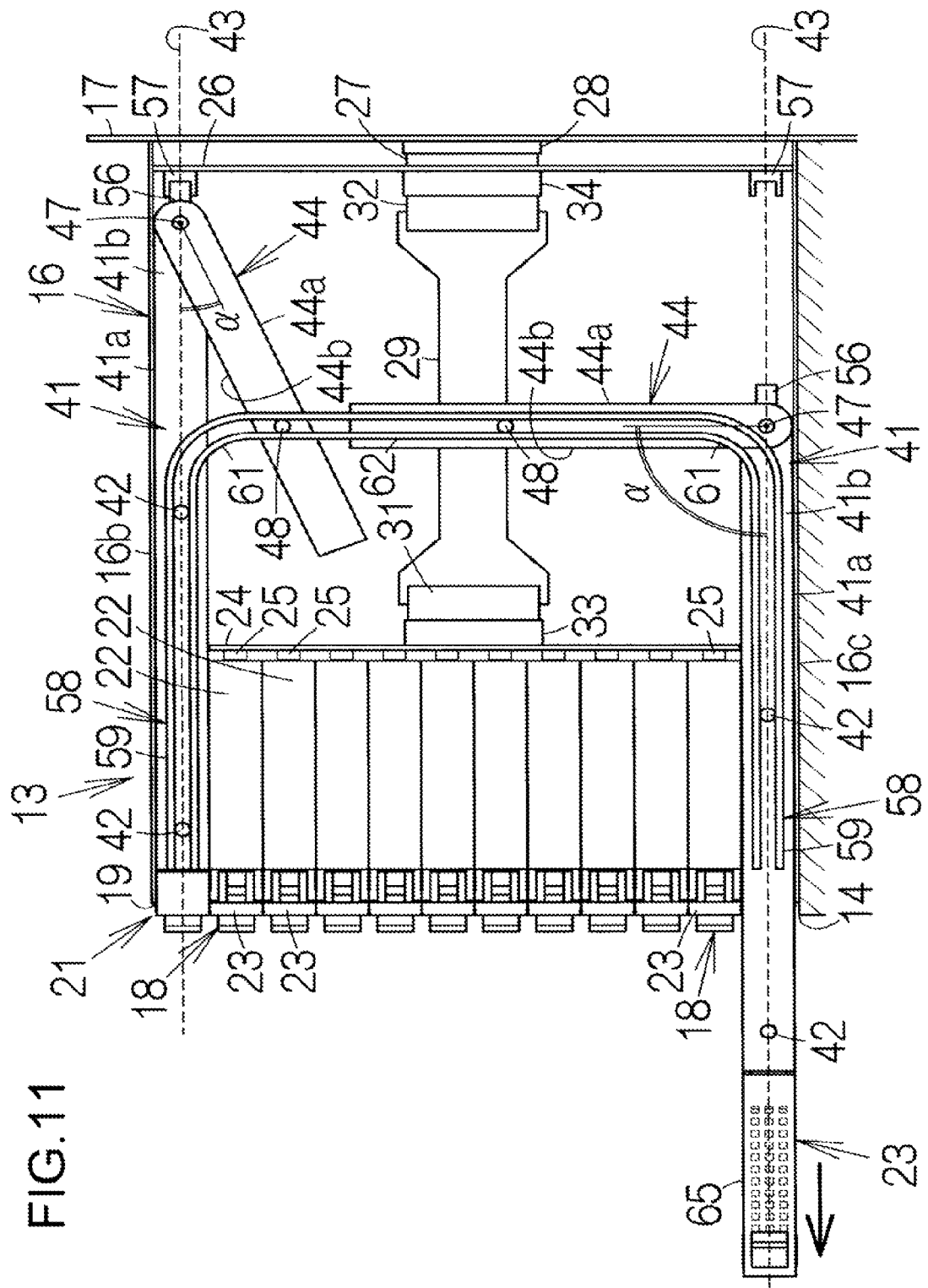
FIG. 11 schematically illustrates a second transparent side view of the lower control board unit that is removed from the housing of the electronic device.
Figure 12:
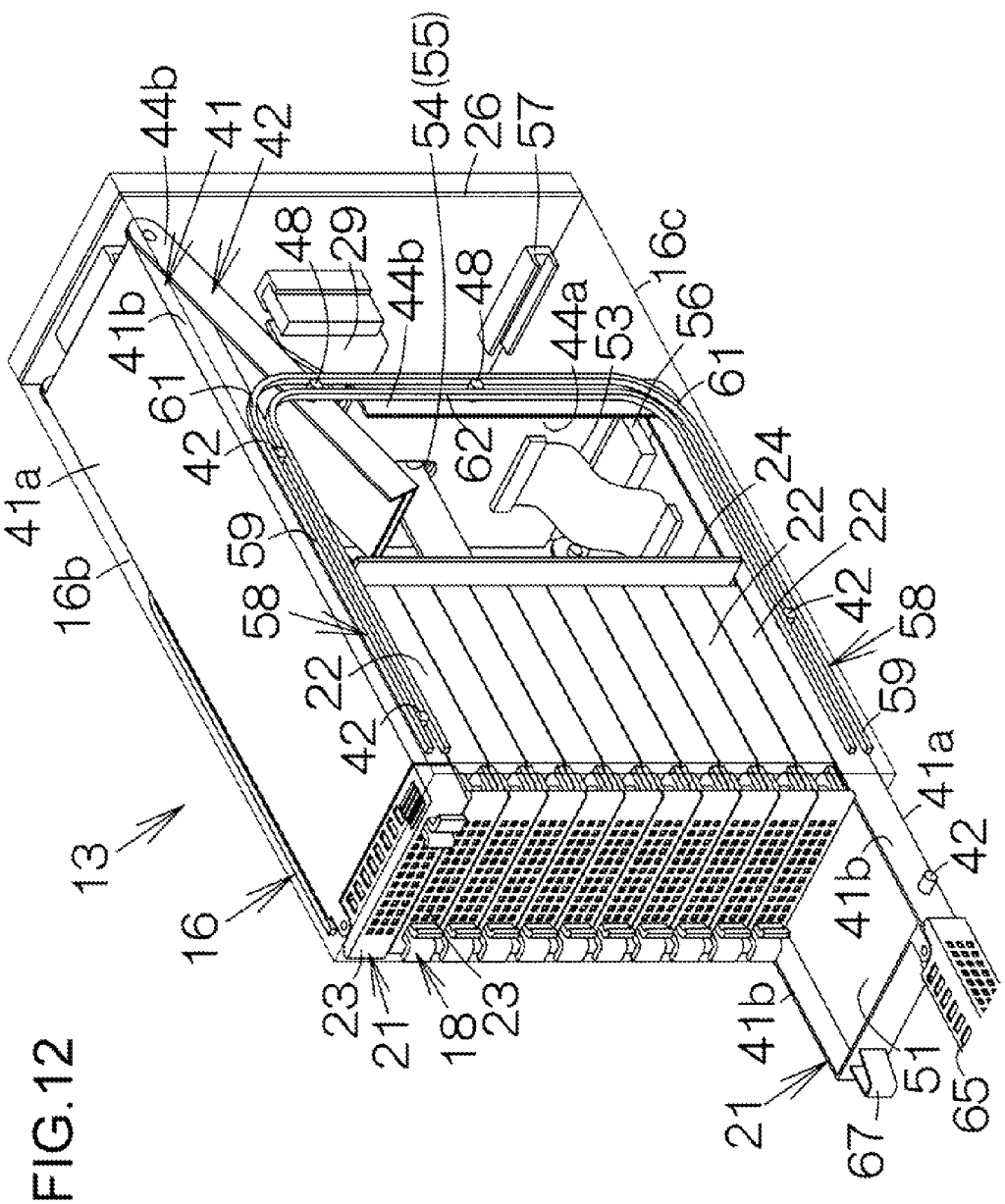
FIG. 12 schematically illustrates a transparent perspective side view of the lower control board unit that is removed from the housing of the electronic device.
Figure 13:
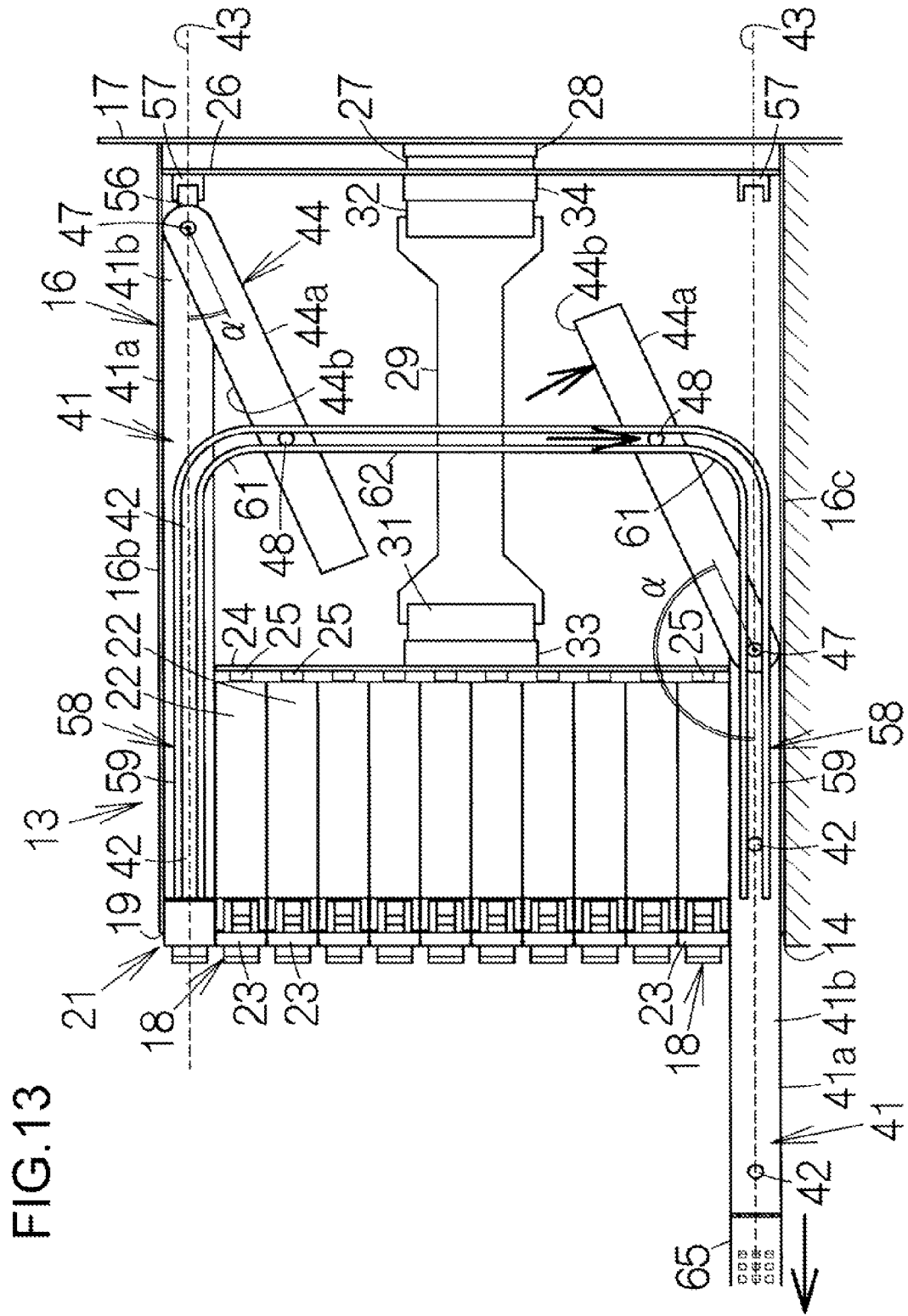
FIG. 13 schematically illustrates a third transparent side view of the lower control board unit that is removed from the housing of the electronic device.

When the first support body 41 is further removed forward from the insertion port 19 along the virtual plane 43, the second support body 44 further rotates about the rotation axis 47. FIG. 11 schematically illustrates a second transparent side view of the lower control board unit 21 that is removed from the housing 16 of the electronic device 13. As a result, as illustrated in FIG. 11, the second support body 44 keeps a vertical attitude perpendicular to the virtual plane 43. The guide pin 48 rises at the maximum height in the third guide rails 62. The intersection angle alpha is kept at 90 degrees. FIG. 12 schematically illustrates a transparent perspective side view of the lower control board unit 21 that is removed from the housing 16 of the electronic device 13. At this time, the slit 54 of the second support body 44 and the slit 55 of the second printed circuit board 52 receive the interconnecting board 29 as illustrated in FIG. 12. The interconnecting board 29 doesn't interfere with the rotation of the second support body 44. Afterward, the guide pin 48 descends in the third guide rails 62 on the basis of the sliding movement of the first support body 41. The intersection angle alpha increases from 90 degrees. FIG. 13 schematically illustrates a third transparent side view of the lower control board unit 21 that is removed from the housing 16 of the electronic device 13. As illustrated in FIG. 13, the guide pin 48 is guided from the third guide rails 62 to the second guide rails 61 and the first guide rails 59.

Figure 14:
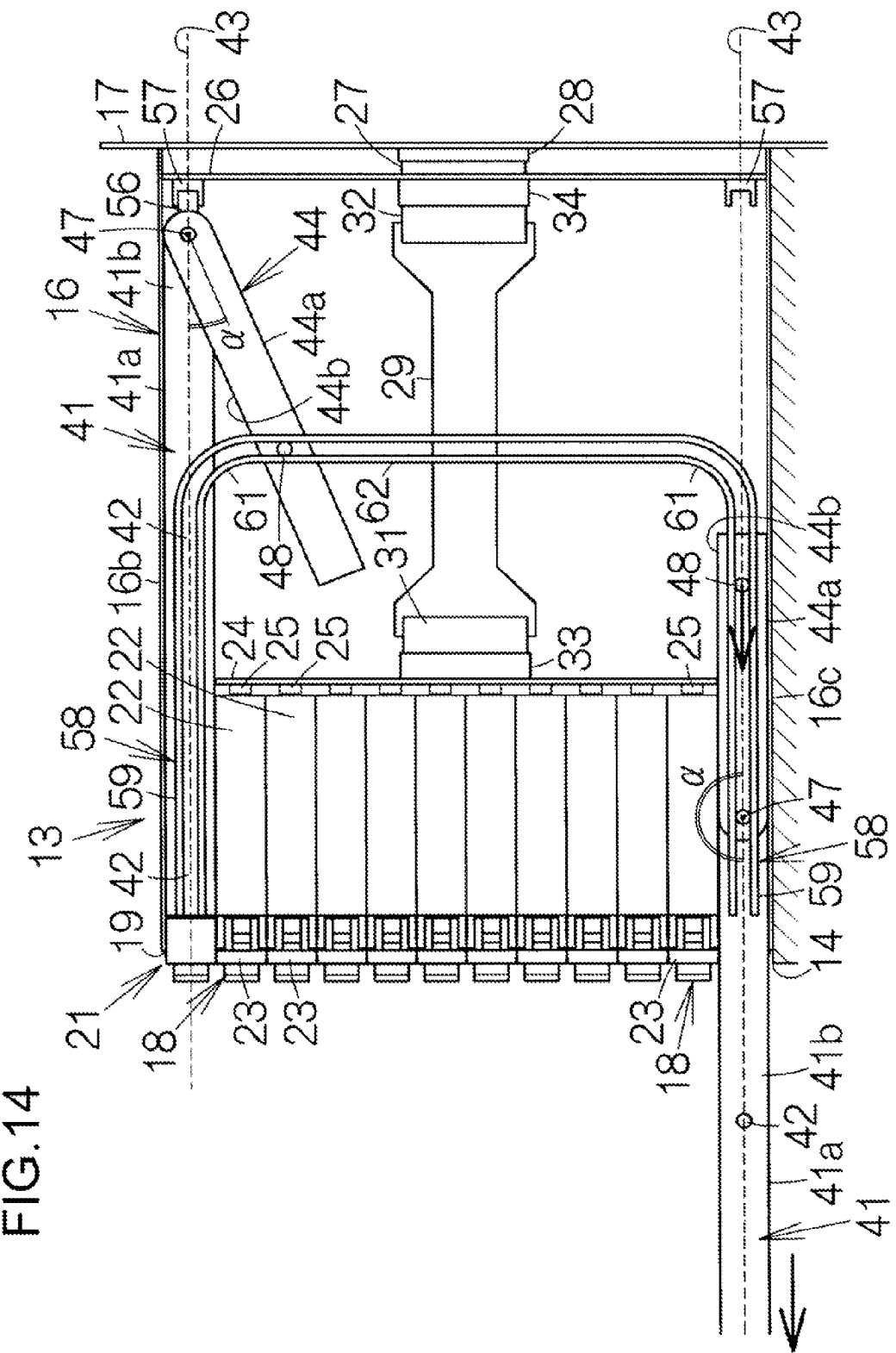
FIG. 14 schematically illustrates a fourth transparent side view of the lower control board unit that is removed from the housing of the electronic device.

FIG. 14 schematically illustrates a fourth transparent side view of the lower control board unit 21 that is removed from the housing 16 of the electronic device 13. When the guide pin 48 moves in the first guide rails 59 as illustrated in FIG. 14, the second support body 44 is received by the bottom plate 16c. The second support body 44 keeps the horizontal attitude along the horizontal plane. The first support body 41 and the second support body 44 extend in parallel with the virtual plane 43. The intersection angle alpha is kept at 180 degrees. Thus, the second support body 44 is received between the lowermost HDD 22 and the bottom plate 16c. The second support body 44 is concurrently removed from the insertion port 19 forward when the first support body 41 is further removed forward. As a result, the lower control board unit 21 is removed from the electronic device 13. And the hot-swapping and the repair of the lower control board unit 21 are performed. At this time, the upper control board unit 21 controls the electronic device 13 to execute. Thus, the electronic device 13 can be continuously operated. Therefore it is avoided to be removed the electronic device 13 from the rack 12. The upper control board unit 21 may be removed as well as the lower control board unit 21.

Figure 15:
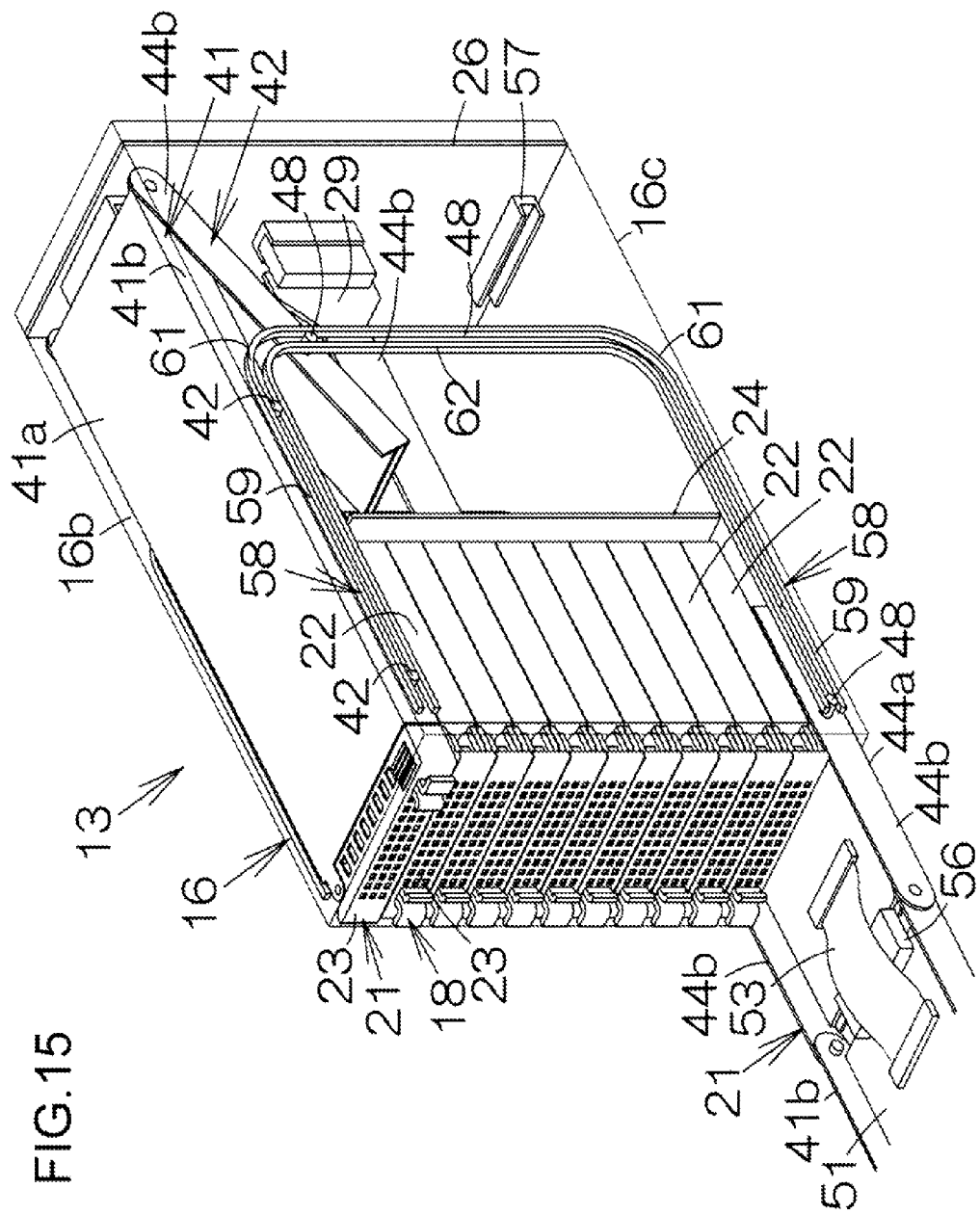
FIG. 15 schematically illustrates a transparent perspective side view of the lower control board unit that is mounted on the housing of the electronic device.
Figure 16:
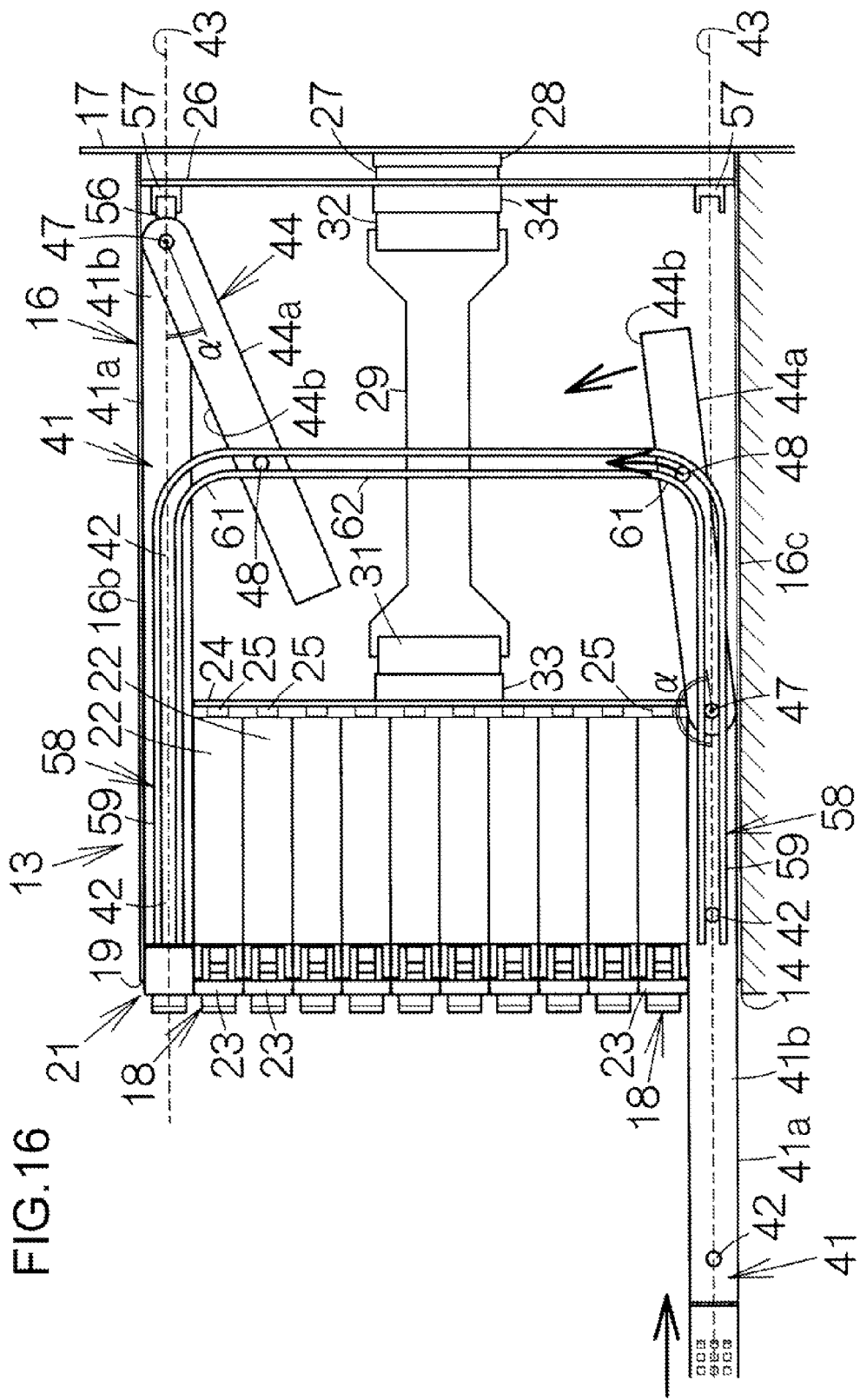
FIG. 16 schematically illustrates a first transparent side view of the lower control board unit that is mounted on the housing of the electronic device.

Next, assume that the lower control board unit 21 is mounted on the electronic device 13. FIG. 15 schematically illustrates a transparent perspective side view of the lower control board unit 21 that is mounted on the housing 16 of the electronic device 13. First of all, the first support body 41 and the second support body 44 are kept at the intersection angle alpha of 180 degrees. The first support body 41 and the second support body 44 keep the horizontal attitude. As illustrated in FIG. 15, the front end of the second support body 44 is inserted into the housing 16 through the insertion port 19. The guide pin 48 is received by the first guide rails 59. The second support body 44 is inserted into the housing 16 on the basis of the guide of the first guide rails 59. The guide pin 42 of the first support body 41 is received by the first guide rails 59. FIG. 16 schematically illustrates a first transparent side view of the lower control board unit 21 that is mounted on the housing 16 of the electronic device 13. When the guide pin 48 moves in the second guide rails 61, the front end of the second support body 44 is lifted on the basis of the guide of the second guide rails 61 as illustrated in FIG. 16. The first support body 41 is kept in parallel with the bottom plate 16c. The intersection angle alpha is decreasing from 180 degrees.

Figure 17:
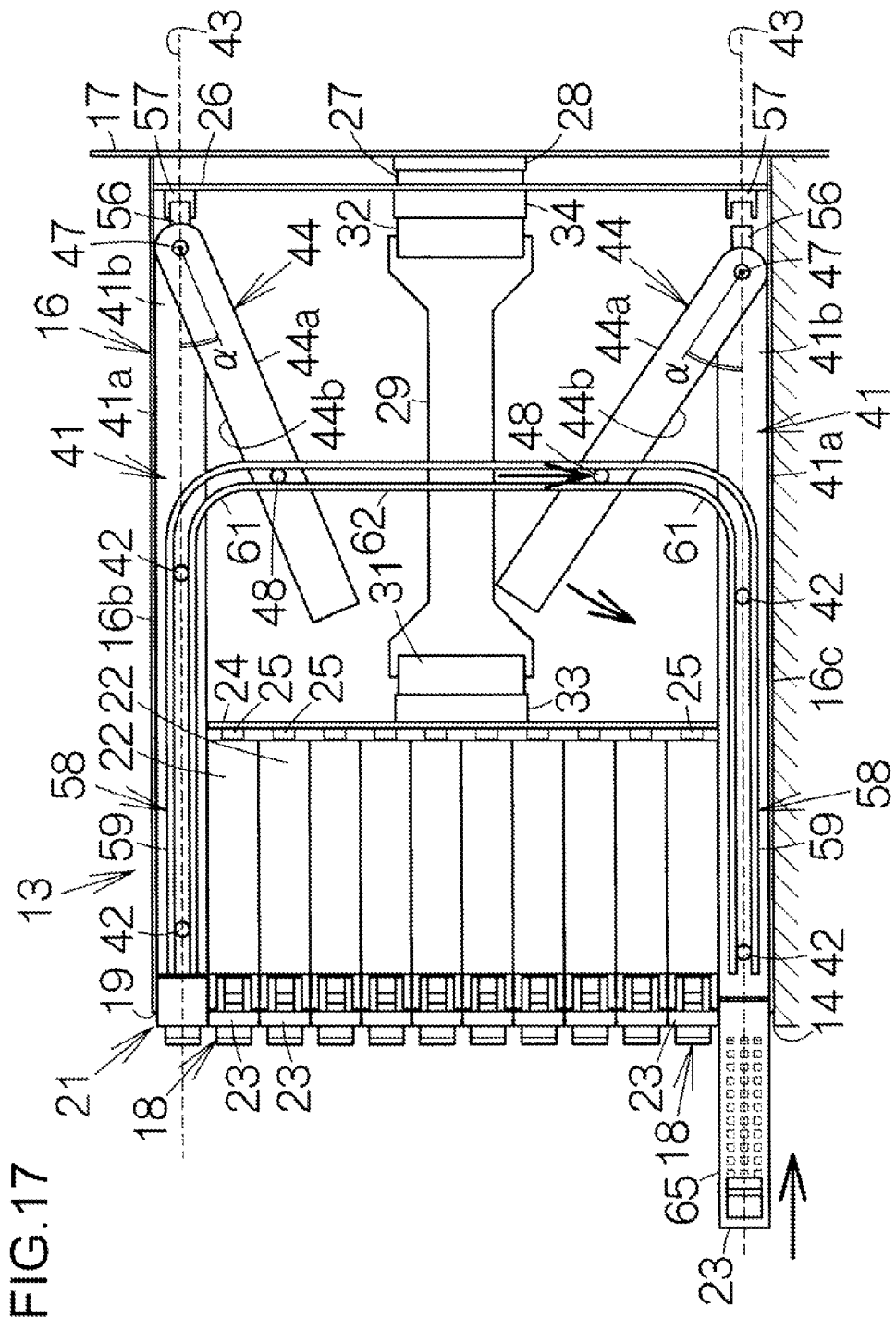
FIG. 17 schematically illustrates a second transparent side view of the lower control board unit that is mounted on the housing of the electronic device.

The second support body 44 is upstanding toward a vertical attitude while the first support body 41 is inserted into the housing 16. The guide pin 48 moves from the second guide rails 61 into the third guide rails 62. When the rotation axis 47 is positioned right under the third guide rails 62, the second support body 44 keeps the vertical attitude. The intersection angle alpha is kept at 90 degrees. The slit 54 of the second support body 44 receives the interconnecting board 29. FIG. 17 schematically illustrates a second transparent side view of the lower control board unit 21 that is mounted on the housing 16 of the electronic device 13. As illustrated in FIG. 17, the guide pin 48 descends in the third guide rails 62 in the direction opposite to the above-mentioned direction where the guide pin 48 moves when the lower control board unit 21 is removed. The intersection angle alpha is decreasing from 90 degrees. The connector 56 of the front end of the first support body 41 is connected to the connector 57 at the same time as the handle part 65 of the ejector unit 23 is coupled with the case 63. Thus, the lower control board unit 21 is mounted in the electronic device 13. The lower control board unit 21 operates the electronic device 13. The upper control board unit 21 may be mounted as well as the lower control board unit 21.

In the above-mentioned server computer apparatus 11, the depth from the front side of the rack 12 to the main back panel 17 is similarly set to the server blade or the storage blade. As a result, the depth of the server blade and the depth of the storage blade are similarly set. On the other hand, the depth of the control board unit 21 is greatly different with respect to the depth of HDD 22 on the basis of the difference in the circuit scale. The depth of the control board unit 21 almost agrees with the depth of the rack 12, as it is desirable for the control board unit 21 to mount as many electronic components as possible. As a result, the depth of the control board unit 21 increases more remarkably than the depth of HDD 22. The dead space is formed between the front panel 24 and the back panel 26. In the present embodiment, the second support body 44, that is, the second printed circuit board 52 is accommodated in the accommodation space between the front panel 24 and the back panel 26. The mounting area of the electronic components is secured for the second printed circuit board 52 in addition to the first printed circuit board 51 on the first support body 41. The dead space is effectively used.

Moreover, a slit 54 on the bottom plate 44a of the second support body 44 and a slit 55 on the second printed circuit board 52 are formed, respectively. When the second support body 44 is accommodated in the accommodation space, the slit 54 and the slit 55 receive the interconnecting board 29. As a result, a relative rotation of the second support body 44 to the first support body 41 is allowed. Therefore, a largest possible area as a mounting area is secured for the second printed circuit board 52. Additionally, the second support body 44 can easily change the attitude from the reference attitude to the inclined attitude using the guide rails 58, when the control board unit 21 is inserted. As a result, the manager only needs to insert the control board unit 21 from the insertion port 19 into the accommodation space of the housing 16. The manager may easily perform to mount the control board unit 21 on the electronic device 13 or remove the control board unit 21 from the electronic device 13 at the front side of the electronic device 13. The mounting operation and the removing operation are simplified. For instance, the hot-swapping or the repair of the control board unit 21 are easily performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An electronic device comprising: a housing having an accommodation space; a first support body being slidably insertable into the accommodation space in parallel with a predetermined plane; a second support body coupled with the first support body rotatably around a rotation axis parallel to a front side of the housing and being rotatable between a reference attitude disposed in the same plane with respect to the first support body and an inclined attitude disposed at a given angle with respect to the first support body; and a drive mechanism for changing the attitude of the second support body from the reference attitude to the inclined attitude in the accommodation space, upon the first support body being inserted into the accommodation space, wherein the drive mechanism includes: a guide component having a central axis parallel to the rotation axis and projecting from the side of the second support body;

a first guide rail for guiding the guide component and extending from a first end of the first guide rail located at the front side of the housing on the predetermined plane to a second end of the first guide rail located nearer the front side of the housing than a front end of the first support body in the accommodation space; a second guide rail for guiding the guide component and extending from a first end of the second guide rail coupled with the second end of the first guide rail to a second end of the second guide rail being away from the predetermined plane toward a back side of the housing from the front side of the housing in the accommodation space; and a third guide rail for guiding the guide component and extending from a first end of the third guide rail coupled with the second end of the second guide rail to a second end of the third guide rail upstanding in a vertical direction perpendicular to the predetermined plane in the accommodation space.

2. The electronic device according to claim 1, further comprising: a first printed circuit board supported by the first support body; and a second printed circuit board supported by the second support body.

3. The electronic device according to claim 1, further comprising: a back panel disposed extending along the back side of the housing in the accommodation space and receiving a front end of the first support body.

4. The electronic device according to claim 3, further comprising: an assisted panel disposed in the accommodation space between the front side of the housing and the back side of the housing and extending in parallel with the back panel; and a storage device being slidably insertable into the accommodation space in parallel with the predetermined plane from the front side of the housing and being coupled with the assisted panel at front end thereof.

5. The electronic device according to claim 4, further comprising: an interconnecting board for connecting the back panel to the assisted panel.

6. The electronic device according to claim 5, wherein the second support body is disposed between the back panel and the assisted panel.

7. The electronic device according to claim 6, wherein the second support body has a slit that extends from a first end of the second support body toward a second end of the second support body and receives the interconnecting board for keeping the inclined attitude, wherein the first end of the second support body is located opposite the second end that is coupled with the first support body.

8. The electronic device according to claim 1, wherein the housing has a bottom plate that extends in parallel with the predetermined plane and receives the first support body.

9. The electronic device according to claim 1, wherein the housing has a top plate that extends in parallel with the predetermined plane and receives the first support body.

10. An electronic device comprising: a housing having an accommodation space; a first printed circuit board being slidably insertable into the accommodation space in parallel with a predetermined plane; a second printed circuit board coupled with the first printed circuit board rotatably around a rotation axis parallel to a front side of the housing and being rotatable between a reference attitude disposed in the same plane with respect to the first printed circuit board and an inclined attitude disposed at a given angle with respect to the first printed circuit board; and a drive mechanism for changing the attitude of the second printed circuit board from the reference attitude to the inclined attitude in the accommodation space, upon the first printed circuit board being inserted into the accommodation space, wherein the drive mechanism includes: a guide component having a central axis parallel to the rotation axis and projecting from the side of the second support body; a first guide rail for guiding the guide component and extending from a first end of the first guide rail located at the front side of the housing on the predetermined plane to a second end of the first guide rail located nearer the front side of the housing than a front end of the first support body in the accommodation space; a second guide rail for guiding the guide component and extending from a first end of the second guide rail coupled with the second end of the first guide rail to a second end of the second guide rail being away from the predetermined plane toward a back side of the housing from the front side of the housing in the accommodation space; and a third guide rail for guiding the guide component and for extending from a first end of the third guide rail coupled with the second end of the second guide rail to a second end of the third guide rail upstanding in a vertical direction perpendicular to the predetermined plane in the accommodation space.

11. The electronic device according to claim 10, further comprising: a first support body for supporting the first printed circuit board; and a second support body for supporting the second printed circuit board.

12. The electronic device according to claim 10, further comprising: a back panel disposed extending along the back side of the housing in the accommodation space and for receiving a front end of the first support body.

13. The electronic device according to claim 12, further comprising: an assisted panel disposed in the accommodation space between the front side of the housing and the back side of the housing and extending in parallel with the back panel; and a storage device being slidably insertable into the accommodation space in parallel with the predetermined plane from the front side of the housing and being coupled with the assisted panel at front end thereof.

14. The electronic device according to claim 13, further comprising: an interconnecting board for connecting the back panel to the assisted panel.

15. The electronic device according to claim 14, wherein the second substrate is disposed between the back panel and the assisted panel.

16. The electronic device according to claim 15, wherein the second printed circuit board has a slit that extends from a first end of the second printed circuit board toward a second end of the second printed circuit board and receives the interconnecting board for keeping the inclined attitude, wherein the first end of the second printed circuit board is located opposite the second end that is coupled with the first printed circuit board.

17. The electronic device according to claim 10, wherein the housing has a bottom plate that extends in parallel with the predetermined plane and receives the first printed circuit board.

18. The electronic device according to claim 10, wherein the housing has a top plate that extends in parallel with the predetermined plane and receives the first printed circuit board.

* * * * *